United States Patent
Li et al.

(10) Patent No.: US 11,916,477 B2
(45) Date of Patent: Feb. 27, 2024

(54) DRIVING POWER CIRCUIT FOR CONVERTER

(71) Applicant: Wuxi Chipown Microelectronics Co., Ltd., Jiangsu (CN)

(72) Inventors: Haisong Li, Jiangsu (CN); Fan Yang, Jiangsu (CN); Binsong Tang, Jiangsu (CN); Yifan Xiao, Jiangsu (CN); Yangbo Yi, Jiangsu (CN)

(73) Assignee: Wuxi Chipown Microelectronics Co., Ltd., Jiangsu (CN)

( * ) Notice: Subject to any disclaimer, the term of this patent is extended or adjusted under 35 U.S.C. 154(b) by 146 days.

(21) Appl. No.: 17/399,928

(22) Filed: Aug. 11, 2021

(65) Prior Publication Data
US 2022/0393591 A1 Dec. 8, 2022

(30) Foreign Application Priority Data
Jun. 7, 2021 (CN) .......................... 202110632877.2

(51) Int. Cl.
*H02M 3/156* (2006.01)
*H02M 1/00* (2006.01)

(52) U.S. Cl.
CPC ......... *H02M 3/156* (2013.01); *H02M 1/0006* (2021.05)

(58) Field of Classification Search
CPC ................................................ H02M 1/0006
See application file for complete search history.

(56) References Cited

U.S. PATENT DOCUMENTS

| | | | |
|---|---|---|---|
| 6,313,616 B1* | 11/2001 | Deller | H02M 3/155 323/282 |
| 9,337,744 B1* | 5/2016 | Tsyrganovich | H02M 1/4208 |
| 2014/0217959 A1* | 8/2014 | Chen | H02J 7/00 323/311 |
| 2019/0356211 A1* | 11/2019 | Chao | H02M 1/08 |
| 2020/0144925 A1* | 5/2020 | Hashim | G05F 1/56 |

FOREIGN PATENT DOCUMENTS

WO    WO-2015056082 A1 *    4/2015    ........... H02M 1/08

OTHER PUBLICATIONS

Machien translation of WO 2015056082 by Strache et al. (Year: 2015).*

* cited by examiner

*Primary Examiner* — Peter M Novak
(74) *Attorney, Agent, or Firm* — Harness, Dickey & Pierce, P.L.C.

(57) ABSTRACT

A voltage conversion circuit and a non-isolated power supply system are provided. The voltage conversion circuit includes: a switching power supply chip which includes a power MOS transistor and a driving circuit, where the driving circuit is adapted to drive the power MOS transistor; and a driving circuit power supply unit which includes a boost unit, wherein when an output voltage of the boost unit is less than a working voltage of the driving circuit, an internal power supply of the switching power supply chip provides the working voltage for the driving circuit; and when the output voltage of the boost unit reaches the working voltage of the driving circuit, the output voltage of the boost unit provides the working voltage for the driving circuit.

13 Claims, 5 Drawing Sheets

US 11,916,477 B2

DRIVING POWER CIRCUIT FOR CONVERTER

CROSS-REFERENCE TO RELATED APPLICATIONS

This application claims the benefit of priority to Chinese Patent Application No. 202110632877.2, filed on Jun. 7, 2021, and entitled "VOLTAGE CONVERSION CIRCUIT AND NON-ISOLATED POWER SUPPLY SYSTEM", the entire disclosure of which is incorporated herein by reference.

TECHNICAL FIELD

The present disclosure generally relates to electronic circuits technology field, and more particularly, to a voltage conversion circuit and a non-isolated power supply system.

BACKGROUND

Switching power supplies are known as high-efficiency and energy-saving power supplies, which represent the development direction of regulated power supplies. Switching power supplies have become mainstream products of regulated power supplies and have been widely used in areas of electric power, communication, transportation and industrial control. Recently, with continuous development and improvement of electronic power and industrial manufacturing technologies, various types of switching power supplies with different functions have appeared, which enable users to have more options.

In prior art, for a traditional non-isolated power supply system including a power supply chip, a high-power MOS transistor is needed to increase an output voltage of the system, however, an internal power supply voltage of the power supply chip is usually not sufficient to drive the high-power MOS transistor. There are two ways to increase the internal power supply voltage of the power supply chip: first, a traditional self-powered structure is used to generate the internal power supply of the chip through a high-voltage input of the chip, which is then used to drive the high-power MOS transistor; second, a winding with a turn ratio of 1:N is used to increase the output voltage of the chip to get a higher voltage which is fed back to the chip to drive the high-power MOS transistor. However, in actual applications, the efficiency of the first self-powered structure is low, and the power loss is high; as for the second method, an extra winding is added to the power supply system, resulting in a more complex structure and a higher assembly cost.

Therefore, a new voltage conversion circuit is needed.

SUMMARY

Embodiments of the present disclosure provide a voltage conversion circuit for a non-isolated power supply system, which has a simple structure, low assembly cost and high efficiency.

In an embodiment of the present disclosure, a voltage conversion circuit is provided, including: a switching power supply chip which includes a power MOS transistor and a driving circuit, where the driving circuit is adapted to drive the power MOS transistor; and a driving circuit power supply unit which includes a boost unit, wherein when an output voltage of the boost unit is less than a working voltage of the driving circuit, an internal power supply of the switching power supply chip provides the working voltage for the driving circuit; and when the output voltage of the boost unit reaches the working voltage of the driving circuit, the output voltage of the boost unit provides the working voltage for the driving circuit.

Optionally, the switching power supply chip further includes: a chip power pin, a chip ground pin and a chip auxiliary power pin.

Optionally, the driving circuit power supply unit further includes a buffer unit, where an input end of the buffer unit is coupled to the chip power pin, and an output end of the buffer unit is coupled to a power input end of the driving circuit and the chip auxiliary power pin; and when the output voltage of the boost unit is less than the working voltage of the driving circuit, the internal power supply of the switching power supply chip provides the working voltage for the driving circuit through the buffer unit.

Optionally, an input end of the boost unit is coupled to the chip power pin and an output end of the boost unit is coupled to the chip auxiliary power pin and the power input end of the driving circuit.

Optionally, the voltage conversion circuit further includes: an auxiliary power supply capacitor, wherein a negative electrode of the auxiliary power supply capacitor is coupled to the chip power pin or the chip ground pin, and a positive electrode of the auxiliary power supply capacitor is coupled to the chip auxiliary power pin; and wherein the auxiliary power supply capacitor is adapted to store charges generated on the chip auxiliary power pin.

Optionally, the auxiliary power supply capacitor is integrated in the switching power supply chip or configured as a peripheral of the switching power supply chip.

Optionally, the switching power supply chip further includes: a control unit, wherein a power input end of the control unit is coupled to the chip power pin, and a first output end of the control unit is coupled to an input end of the driving circuit, which is adapted to provide a first control signal for the driving circuit.

Optionally, the first control signal is a switch control signal.

Optionally, the buffer unit includes a diode.

Optionally, the buffer unit includes a first MOS transistor, wherein a gate of the first MOS transistor is coupled to a second output end of the control unit and is adapted to receive a second control signal from the second output end; a source of the first MOS transistor is coupled to the chip power pin; and a drain of the first MOS transistor is coupled to the power input end of the driving circuit and the chip auxiliary power pin.

Optionally, the second control signal is adapted to control the first MOS transistor to switch on or off: when a voltage on the chip auxiliary power pin is less than the working voltage of the driving circuit, the second control signal controls the first MOS transistor to switch on, and the chip power pin provides the working voltage for the driving circuit through the first MOS transistor; and when the voltage on the chip auxiliary power pin reaches the working voltage of the driving circuit, the second control signal controls the first MOS transistor to switch off, and the chip auxiliary power pin provides the working voltage for the driving circuit.

Optionally, the boost unit includes a charge pump circuit.

Optionally, the driving circuit includes N NMOS transistors and M PMOS transistors; and wherein all gates of the N NMOS transistors and the M PMOS transistors are coupled to the first output end of the control unit, and are adapted to input the first control signal; drains of the N NMOS transistors and the M PMOS transistors are coupled together to work as an output end of the driving circuit, which is coupled to a gate of the power MOS transistor; and all sources of the N NMOS transistors are coupled to the chip ground pin, and all sources of the M PMOS transistors are coupled together to work as the power input end of the driving circuit, which is adapted to receive the working voltage form the driving circuit power supply unit.

In an embodiment of the present disclosure, a non-isolated power supply system is provided, including: a rectifier unit, an output inductor, a feedback diode, and a voltage conversion circuit; wherein an input end of the rectifier unit is coupled to an external Alternating Current (AC) power supply, an output end of the rectifier unit is coupled to a high-voltage input pin of the switching power supply chip of the voltage conversion circuit, and the rectifier unit is adapted to rectify an externally input AC into a Direct Current (DC) which is input to the high-voltage input pin; wherein an input end of the output inductor is coupled to the chip ground pin of the switching power supply chip, and an output end of the output inductor is coupled to an output end of the non-isolated power supply system; and wherein a positive electrode of the feedback diode is coupled to the output end of the non-isolated power supply system, and a negative electrode of the feedback diode is coupled to the chip power pin, which is adapted to feed back an output voltage of the non-isolated power supply system to the chip power pin.

Optionally, the control unit further includes: a third output end, which is coupled to a control signal input end of the boost unit and is adapted to control the boost unit to switch on or off, wherein when the output voltage of the non-isolated power supply system is high and a voltage of the chip power pin reaches a working voltage of the driving circuit, the third output end of the control unit outputs a third control signal to control the boost unit to switch off, and the chip power pin provides the working voltage for the driving circuit through the buffer unit of the switching power supply chip; and when the output voltage of the non-isolated power supply system is low and the voltage of the chip power pin is less than the working voltage of the driving circuit, the third output end of the control unit outputs the third control signal to turn on the boost unit and an output end of the boost unit provides the working voltage for the driving circuit.

Optionally, the non-isolated power supply system further includes: an output capacitor which has a positive electrode coupled to the output end of the non-isolated power supply system and a negative electrode coupled to a ground pin of the non-isolated power supply system; a chip power capacitor which has a positive electrode coupled to the chip power pin and a negative electrode coupled to the chip ground pin; and a freewheel diode which has a positive electrode coupled to the ground pin of the non-isolated power system and a negative electrode coupled to the input end of the output inductor.

In summary, according to the embodiments of the present disclosure, when the output voltage of the chip power pin is relatively low and cannot drive the power MOS transistor, the driving circuit power supply unit of the voltage conversion circuit is started to boost the output voltage of the chip power pin, so as to generate a boosted voltage to drive the power MOS transistor. The boosted voltage is generated from an internal power supply of the switching power supply chip instead of an external power supply, which facilitates to reduce power loss and improve conversion efficiency of the switching power supply chip.

Further, the voltage conversion circuit further includes an auxiliary power supply capacitor, which is adapted to store charges generated on the chip auxiliary power pin, thereby improving the power supply capability of the chip auxiliary power pin. Further, the auxiliary power supply capacitor may be integrated in the switching power supply chip or configured as a peripheral of the switching power supply chip, which has a simple structure and a low cost.

Further, a feedback diode is configured in the non-isolated power supply system, which feeds back the output voltage of the non-isolated power supply system to the chip power pin of the switching power supply chip, and the boost unit is controlled to switch on or off according to the output voltage of the non-isolated power supply system. The non-isolated power supply system provided in the embodiments has a high voltage conversion efficiency, a low power loss and a simple structure.

DETAILED DESCRIPTION

As described in the background, in the prior art, a non-isolated power supply system with a self-powered structure has a low efficiency and a high power loss; and a non-isolated power supply system with a winding having a turn ratio of 1:N has a complex structure and a high assembly cost.

In order to clarify the object, characteristic and advantages of embodiments of the present disclosure, embodiments of present disclosure will be described clearly in detail in conjunction with accompanying drawings.

Figure 1:
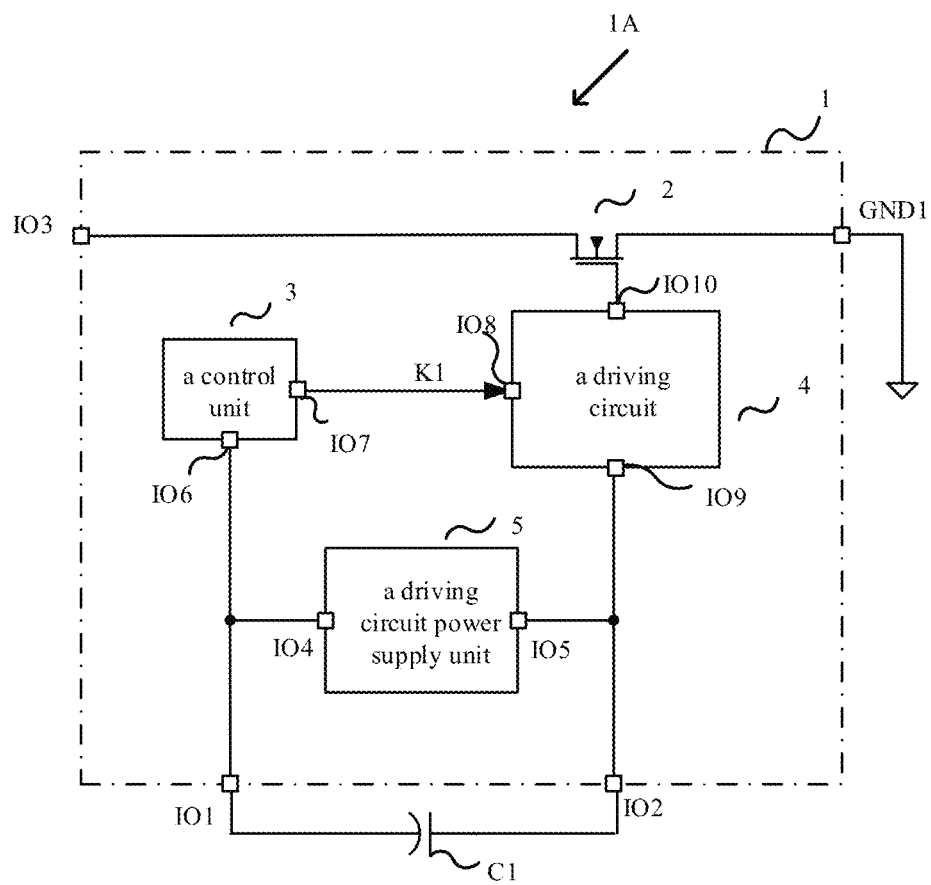
FIG. 1 schematically illustrates a structural diagram of a voltage conversion circuit according to an embodiment.
Figure 2:
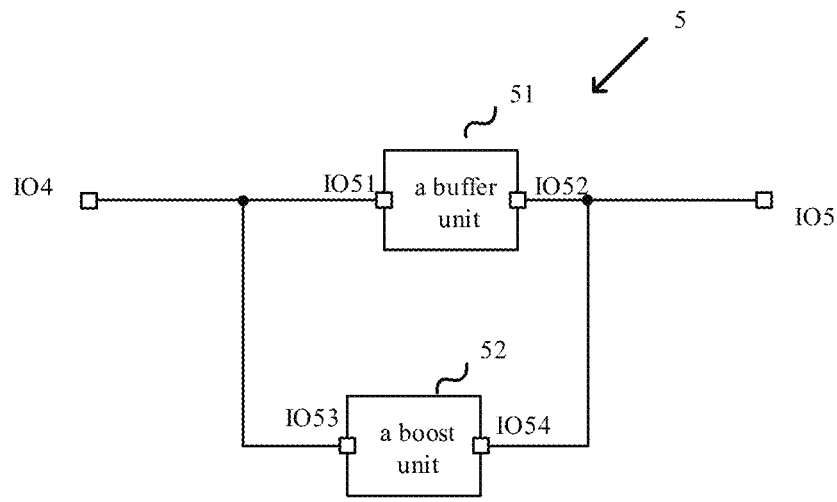
FIG. 2 schematically illustrates a structural diagram of a driving circuit power supply unit of the voltage conversion circuit shown in FIG. 1 according to an embodiment.

FIG. 1 schematically illustrates a structural diagram of a voltage conversion circuit according to an embodiment, and FIG. 2 schematically illustrates a structural diagram of a driving circuit power supply unit of the voltage conversion circuit shown in FIG. 1 according to an embodiment. Principles, structures and advantages of the voltage conversion circuit will be described in detail below with reference to FIGS. 1 and 2. A voltage conversion circuit 1A includes a switching power supply chip 1, where the switching power supply chip 1 includes a power MOS transistor 2 and a driving circuit 4 which is adapted to drive the power MOS transistor 2. The voltage conversion circuit 1A further includes a driving circuit power supply unit 5 which includes a boost unit 52, wherein when an output voltage of the boost unit 52 is less than a working voltage of the driving circuit 4, an internal power supply of the switching power supply chip 1 provides the working voltage for the driving circuit 4; and when the output voltage of the boost unit 52 reaches the working voltage of the driving circuit 4, the output voltage of the boost unit 52 provides the working voltage for the driving circuit 4.

In an embodiment, the switching power supply chip 1 further includes: a chip power pin IO1, a chip ground pin GND1 and a chip auxiliary power pin IO2.

In an embodiment, an input end IO4 of the driving circuit power supply unit 5 is coupled to the chip power pin IO1, and an output end IO5 of the driving circuit power supply unit 5 is coupled to the chip auxiliary power pin IO2 and a power input end IO9 of the driving circuit.

In an embodiment, the voltage conversion circuit 1A further includes an auxiliary power supply capacitor C1, wherein a negative electrode of the auxiliary power supply capacitor C1 is coupled to the chip power pin IO1 or the chip ground pin GND1, and a positive electrode of the auxiliary power supply capacitor C1 is coupled to the chip auxiliary power pin IO2; and the auxiliary power supply capacitor C1 is adapted to store charges generated on the chip auxiliary power pin IO2.

In an embodiment, the auxiliary power supply capacitor C1 may be configured as a peripheral of the switching power supply chip 1, as shown in FIG. 1. In another embodiment, the auxiliary power supply capacitor C1 may be integrated in the switching power supply chip 1.

In an embodiment, the switching power supply chip 1 further includes a control unit 3. A power input end IO6 of the control unit 3 is coupled to the chip power pin IO1, and a first output end IO7 of the control unit 3 is coupled to an input end IO8 of the driving circuit 4, which is adapted to provide a first control signal K1 for the driving circuit 4. Specifically, the first control signal is a switch control signal. In an embodiment, the first control signal is a Pulse Width Modulation (PWM) signal. Those skilled in the art can understand that structures and working principles of the control circuit are well-known in the art which are not described in detail here and should not limit the protection scope of the present disclosure.

Referring to FIG. 2, in an embodiment, the driving circuit power supply unit 5 includes a buffer unit 51 and a boost unit 52. An input end IO51 of the buffer unit 51 and an input end IO53 of the boost unit 52 are coupled together as the input end IO4 of the driving circuit power supply unit 5; an output end IO52 of the buffer unit 51 and an output end IO54 of the boost unit 52 are coupled together as the output end IO5 of the driving circuit power supply unit 5. Referring to FIGS. 1 and 2, the input end IO51 of the buffer unit 51 and the input end IO53 of the boost unit 52 are both coupled to the chip power pin IO1; the output end IO52 of the buffer unit 51 and the output end IO54 of the boost unit 52 are both coupled to the power input end IO9 of the driving circuit and the chip auxiliary power pin IO2, and are adapted to provide the working voltage for the driving circuit 4. Specifically, when the voltage on the chip auxiliary power pin IO2 is less than the working voltage of the driving circuit 4, the chip power pin IO1 provides the working voltage for the driving circuit 4 through the buffer unit 51; and when the voltage on the chip auxiliary power pin IO2 reaches the working voltage of the driving circuit 4, the chip auxiliary power pin IO2 provides the IO2 voltage for the driving circuit 4.

In an embodiment, the boost unit includes a charge pump circuit. Those skilled in the art can understand that structures and working principles of the charge pump circuit are well-known in the art, and are not described in detail here. Those skilled in the art can understand that, in other embodiments, the boost unit may include another circuit with boosting function, as long as a low-voltage end of the circuit with boosting function works as the input end of the boost unit and a high-voltage end of the circuit with boosting function works as the output end of the boost unit.

Figure 3:
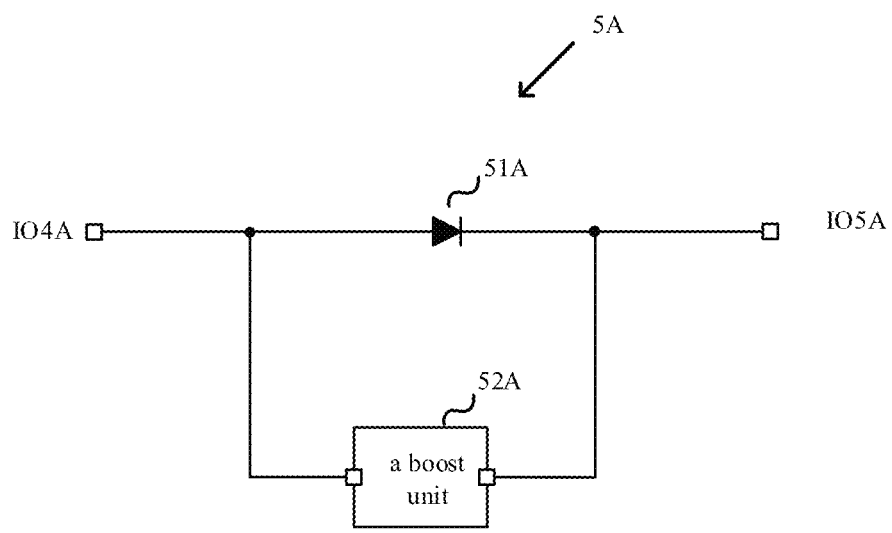
FIG. 3 schematically illustrates a circuit structural diagram of the driving circuit power supply unit shown in FIG. 2 according to an embodiment.

In an embodiment, the buffer unit includes a diode, as shown in FIG. 3, which schematically illustrates a circuit structural diagram of the driving circuit power supply unit 5A shown in FIG. 2 according to an embodiment. Referring to FIG. 3, a positive electrode of a diode 51A and an input end (a low-voltage end) of a boost unit 52A are coupled together as an input end IO4A of the driving circuit power supply unit 5A, and an input end IO4A of the driving circuit power supply unit 5A is coupled to the chip power pin IO1; a negative electrode of the diode 51A and an output end (a high-voltage end) of the boost unit 52A are coupled together as an output end IO5A of the driving circuit power supply unit 5A, and the output end IO5A of the driving circuit power supply unit 5A is coupled to the power input end IO9 of the driving circuit and the chip auxiliary power pin IO2.

Referring to FIGS. 1 and 3, in addition to providing working voltage to other modules in the switching power supply chip 1, the chip power pin IO1 also provides working voltage for the driving circuit power supply unit 5A. When the voltage on the chip power pin IO1 is relatively low, the voltage on the chip power pin IO1 is input to the input end IO4A of the driving circuit power supply unit 5, and is boosted by the boost unit 52A, so as to generate a chip auxiliary power supply on the chip auxiliary power pin IO2. Since it takes time to generate the chip auxiliary power supply on the chip auxiliary power pin IO2, when the chip auxiliary power supply is less than the working voltage of the driving circuit 4, the chip power pin IO1 supplies power to the driving circuit 4 through the diode 51A; and when the chip auxiliary power supply reaches the working voltage of the driving circuit 4, the buffer unit is turned off, that is, the diode 51A is reversely cut off, and the chip auxiliary power supply generated on the chip auxiliary power pin IO2 provides the working voltage for the driving circuit 4. Because of the boost unit 51A, the chip auxiliary power supply is higher than the voltage on the chip power pin IO1, which can meet the working requirement of the driving circuit 4.

Figure 4:
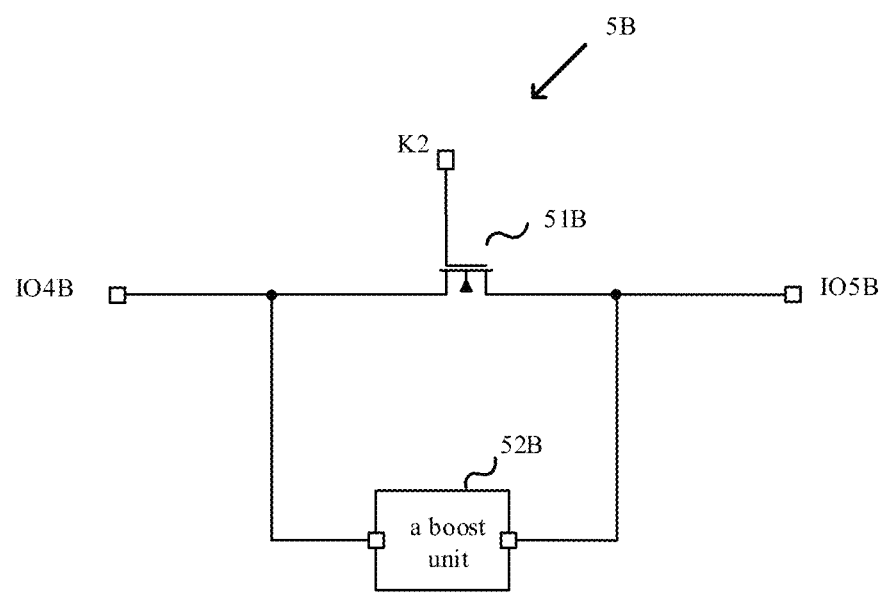
FIG. 4 schematically illustrates a circuit structural diagram of the driving circuit power supply unit shown in FIG. 2 according to another embodiment.

In another embodiment, the buffer unit includes a first MOS transistor 51B, as shown in FIG. 4, which schematically illustrates a circuit structural diagram of the driving circuit power supply unit 5B shown in FIG. 2 according to another embodiment. Referring to FIG. 4, a gate of the first MOS transistor 51B is coupled to a second output end of the control unit 3, which is adapted to receive a second control signal K2 from the second output end. The second control signal K2 is used to control the first MOS transistor 51B to switch on or off; a source of the first MOS transistor 51B and an input end (a low-voltage end) of a boost unit 52B are coupled together as an input end IO4B of the driving circuit power supply unit 5B which is coupled to the chip power pin IO1; and a drain of the first MOS transistor 51B and an output end (a high-voltage end) of the boost unit 52B are coupled together as an output end IO5B of the driving circuit power supply unit 5B which is coupled to the power input end IO9 of the driving circuit and the chip auxiliary power pin IO2.

Referring to FIGS. 1 and 4, in addition to providing working voltage to other modules in the switching power supply chip 1, the chip power pin IO1 also provides working voltage for the driving circuit power supply unit 5B. When the voltage on the chip power pin IO1 is relatively low, the second control signal K2 controls the first MOS transistor 51B to switch on, so the voltage on the chip power pin IO1 is input to the input end IO4B of the driving circuit power supply unit 5B and is boosted by the boost unit 52B, so as to generate a chip auxiliary power supply on the chip auxiliary power pin IO2. Since it takes time to generate the chip auxiliary power supply on the chip auxiliary power pin IO2, when the chip auxiliary power supply is less than the working voltage of the driving circuit 4, the chip power pin IO1 supplies power to the driving circuit 4 through the first MOS transistor 51B; and when the chip auxiliary power supply reaches the working voltage of the driving circuit 4, the buffer unit is turned off, that is, the second control signal K2 controls the first MOS transistor 51B to switch off, and the chip auxiliary power supply generated on the chip auxiliary power pin IO2 provides the working voltage for the driving circuit 4. Because of the boost unit 51B, the chip auxiliary power supply is higher than the voltage on the chip power pin IO1, which can meet the working requirement of the driving circuit 4.

Figure 5:
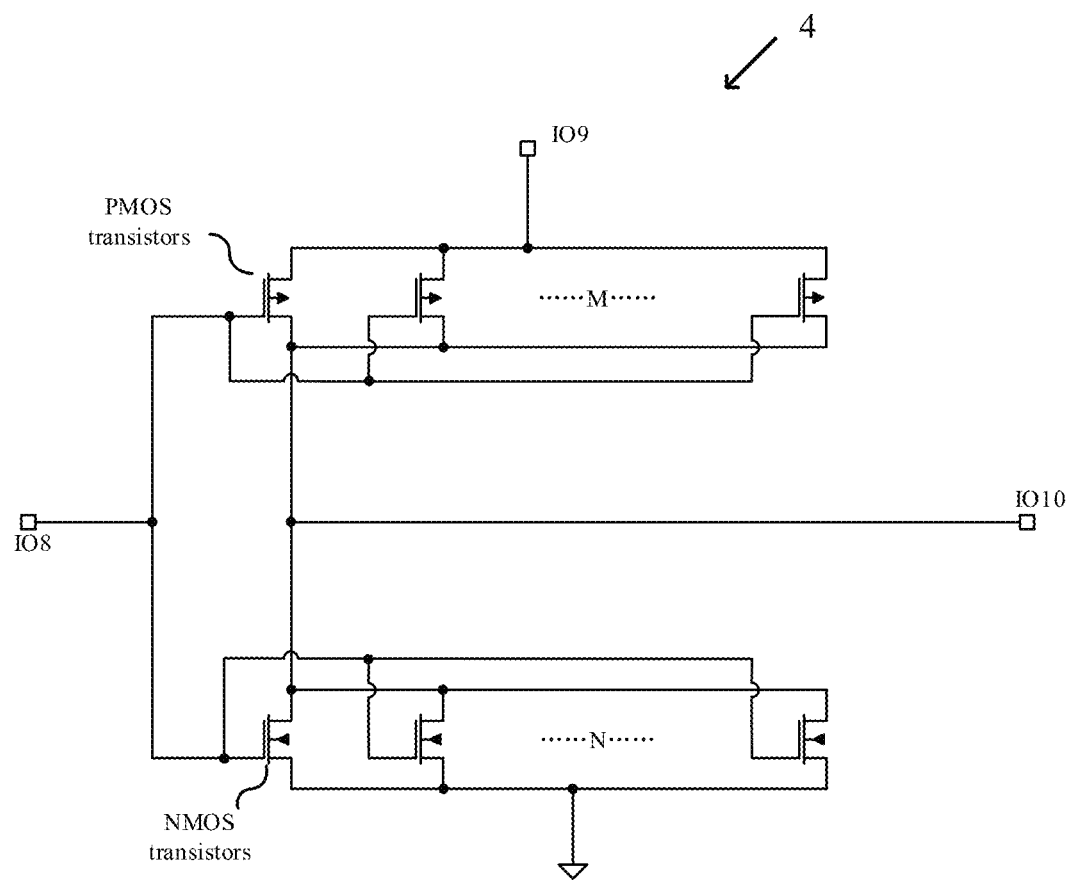
FIG. 5 schematically illustrates a structural diagram of a driving circuit according to an embodiment.

FIG. 5 schematically illustrates a structural diagram of a driving circuit according to an embodiment. Referring to FIGS. 1 and 5, in an embodiment, the driving circuit 4 includes N NMOS transistors and M PMOS transistors; and wherein all gates of the N NMOS transistors and the M PMOS transistors are coupled together to form a control signal input end IO8 which is coupled to the first output end IO7 of the control unit 3 and adapted to input the first control signal K1; drains of the N NMOS transistors and the M PMOS transistors are coupled together to work as the output end of the driving circuit 4, which is coupled to a gate 1010 of the power MOS transistor 2; and all sources of the N NMOS transistors are coupled to the chip ground pin GND1, and all sources of the M PMOS transistors are coupled together to work as the power input end IO9 of the driving circuit 4, and the driving circuit power supply unit 5 provides the working voltage for the driving circuit 4.

In conclusion, the voltage conversion circuit provided in the embodiments of the present disclosure includes a buffer unit and a boost unit. When the voltage on the chip power pin is relatively low, the boost unit works to boost the voltage on the chip power pin, and the chip auxiliary power supply is generated on the chip auxiliary power pin, meanwhile, the chip power pin provides working voltage for the driving circuit on the switching power supply chip through the buffer unit; and when the voltage output by the boost unit can meet the requirements of the driving circuit, the buffer unit is turned off, and the voltage output of the boost unit provides working voltage for the driving circuit. Because of the boost unit, the chip auxiliary power supply is higher than the voltage on the chip power pin, which can meet the requirements of the driving circuit. Further, the voltage conversion circuit further includes an auxiliary power supply capacitor, which is adapted to store charges generated on the chip auxiliary power pin, thereby improving the power supply capability of the chip auxiliary power pin. Further, the auxiliary power supply capacitor may be integrated in the switching power supply chip or configured as a peripheral of the switching power supply chip, which has a simple structure and a low cost.

Figure 6:
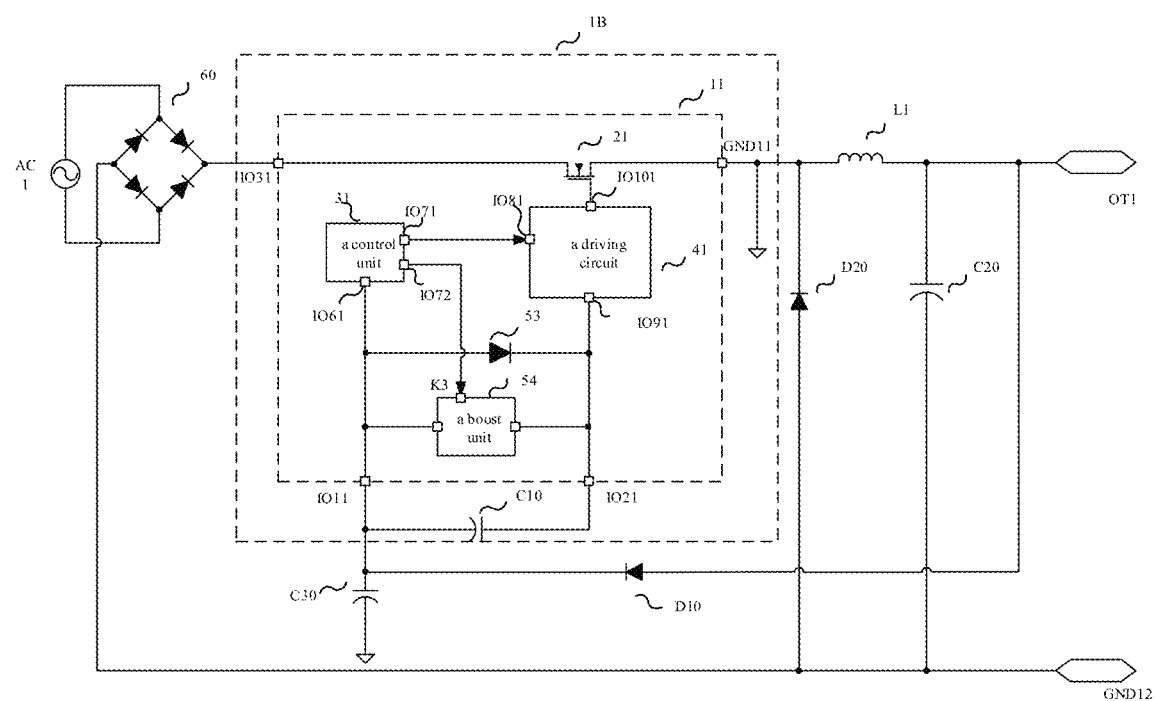
FIG. 6 schematically illustrates a structural diagram of a non-isolated power supply system according to an embodiment.

FIG. 6 schematically illustrates a structural diagram of a non-isolated power supply system according to an embodiment.

Referring to FIG. 6, the non-isolated power supply system includes: a rectifier unit 60, an output inductor L1, a feedback diode D10, and a voltage conversion circuit 1B. The voltage conversion circuit 1B includes a switching power supply chip 11 which includes a power MOS transistor 21 and a driving circuit 41. The driving circuit 41 is adapted to drive the power MOS transistor 21 to work. The voltage conversion circuit 1B further includes a driving circuit power supply unit which includes a buffer unit 53 and a boost unit 54. In an embodiment, the buffer unit 53 is a snubber diode.

In an embodiment, the voltage conversion circuit 1B further includes an auxiliary power supply capacitor C10. As shown in FIG. 6, the auxiliary power supply capacitor C10 is configured as a peripheral of the switching power supply chip 11, which has a positive electrode coupled to a chip auxiliary power pin IO21 and a negative electrode coupled to a chip power pin IO11 In other embodiments, the auxiliary power supply capacitor C10 may be integrated in the switching power supply chip 11. Connection ways and working principles of the auxiliary power supply capacitor C10 may refer to the descriptions of the foregoing embodiments, and will not be repeated here.

Structures and working principles of the voltage conversion circuit 1B may refer to the descriptions of the foregoing embodiments, and will not be repeated here.

Referring to FIG. 6, in an embodiment, an input end of the rectifier unit 60 is coupled to an external (Alternating Current) AC power supply AC1, an output end of the rectifier unit 60 is coupled to a high-voltage input pin IO31 of the switching power supply chip 11 of the voltage conversion circuit 1B, and the rectifier unit 60 is adapted to rectify the externally AC power supply AC1 into a Direct Current (DC) which is input to the high-voltage input pin IO31; an input end of the output inductor L1 is coupled to a chip ground pin GND 11 of the switching power supply chip 11, and an output end of the output inductor L1 is coupled to an output end OT1 of the non-isolated power supply system; and a positive electrode of the feedback diode D10 is coupled to the output end OT1 of the non-isolated power supply system, and a negative electrode of the feedback diode D10 is coupled to the chip power pin IO11, which is adapted to provide an output voltage of the non-isolated power supply system to the chip power pin IO11.

In an embodiment, the switching power supply chip 11 further includes a control unit 31, where the control unit 31 includes a first output end IO71 which is coupled to an input end IO81 of the driving circuit 41 and is adapted to provide a first control signal for the driving circuit 41. The control unit 31 further includes: a third output end IO72, which is coupled to a control signal input end of the boost unit 54 and is adapted to receive a third control signal K3, so as to control the boost unit 54 to switch on or off. Specifically, when the output voltage of the output end OT1 of the non-isolated power supply system is high and a voltage of the chip power pin IO11 reaches the working voltage of the driving circuit 41, the third output end IO72 of the control unit 31 outputs the third control signal K3 to control the boost unit 54 to switch off, and the chip power pin IO11 supplies working voltage to the driving circuit 41 through the buffer unit 53 of the switching power supply chip 11. And when the output voltage of the output end OT1 of the non-isolated power supply system is low and the voltage of the chip power pin IO11 is less than the working voltage of the driving circuit 41, the third output end IO72 of the control unit 31 outputs the third control signal K3 to turn on the boost unit 54 and an output end of the boost unit 54 provides the working voltage for the driving circuit 41. In this case, the negative electrode of the snubber diode 53 has a voltage higher than the positive electrode, which turns the snubber diode 53 into in a reverse cut-off state. Therefore, the chip power pin IO11 cannot provide working voltage to a voltage input end IO91 of the driving circuit 41, and only the chip auxiliary power pin IO21 provides working voltage for the driving circuit 41.

In an embodiment, the non-isolated power supply system further includes:

an output capacitor C20 which has a positive electrode coupled to the output end OT1 of the non-isolated power supply system and a negative electrode coupled to a ground pin GND12 of the non-isolated power supply system;

a chip power capacitor C30 which has a positive electrode coupled to the chip power pin IO11 and a negative electrode coupled to the chip ground pin GND11; and a freewheel diode D20 which has a positive electrode coupled to the ground pin GND12 of the non-isolated power system and a negative electrode coupled to the input end of the output inductor.

In summary, according to the embodiments of the present disclosure, when the output voltage of the chip power pin is relatively low and cannot drive the power MOS transistor, the driving circuit power supply unit of the voltage conversion circuit is started to boost the output voltage of the chip power pin, so as to generate a boosted voltage to drive the power MOS transistor. The boosted voltage is generated from an internal power supply of the switching power supply chip instead of an external power supply, which facilitates to reduce power loss and improve conversion efficiency of the switching power supply chip.

Further, the voltage conversion circuit further includes an auxiliary power supply capacitor, which is adapted to store charges generated on the chip auxiliary power pin, thereby improving the power supply capability of the chip auxiliary power pin. Further, the auxiliary power supply capacitor may be integrated in the switching power supply chip or configured as a peripheral of the switching power supply chip, which has a simple structure and a low cost.

Further, a feedback diode is configured in the non-isolated power supply system, which feeds back the output voltage of the non-isolated power supply system to the chip power pin of the switching power supply chip, and the boost unit is controlled to switch on or off according to the output voltage of the non-isolated power supply system. The non-isolated power supply system provided in the embodiments has a high voltage conversion efficiency, a low power loss and a simple structure.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A voltage conversion circuit, comprising:
a switching power supply chip which comprises a power MOS transistor and a driving circuit, where the driving circuit is adapted to drive the power MOS transistor; and
a driving circuit power supply unit which comprises a boost unit, wherein when an output voltage of the boost unit is less than a working voltage of the driving circuit, an internal power supply of the switching power supply chip provides the working voltage for the driving circuit; and when the output voltage of the boost unit reaches the working voltage of the driving circuit, the output voltage of the boost unit provides the working voltage for the driving circuit;
wherein the switching power supply chip further comprises: a chip power pin, a chip ground pin and a chip auxiliary power pin;
wherein the driving circuit power supply unit further comprises a buffer unit, where an input end of the buffer unit is coupled to the chip power pin, and an output end of the buffer unit is coupled to a power input end of the driving circuit and the chip auxiliary power pin; and when the output voltage of the boost unit is less than the working voltage of the driving circuit, the internal power supply of the switching power supply chip provides the working voltage for the driving circuit through the buffer unit; and
wherein the buffer unit comprises a first MOS transistor, a gate of the first MOS transistor is coupled to a second output end of the control unit and is adapted to receive a second control signal from the second output end, a source of the first MOS transistor is coupled to the chip power pin, and a drain of the first MOS transistor is coupled to the power input end of the driving circuit and the chip auxiliary power pin.

2. The voltage conversion circuit according to claim 1, wherein the second control signal is adapted to control the first MOS transistor to switch on or off: when a voltage on the chip auxiliary power pin is less than the working voltage of the driving circuit, the second control signal controls the first MOS transistor to switch on, and the chip power pin provides the working voltage for the driving circuit through the first MOS transistor; and when the voltage on the chip auxiliary power pin reaches the working voltage of the driving circuit, the second control signal controls the first MOS transistor to switch off, and the chip auxiliary power pin provides the working voltage for the driving circuit.

3. The voltage conversion circuit according to claim 1, wherein an input end of the boost unit is coupled to the chip power pin and an output end of the boost unit is coupled to the chip auxiliary power pin and the power input end of the driving circuit.

4. The voltage conversion circuit according to claim 3, wherein the boost unit comprises a charge pump circuit.

5. The voltage conversion circuit according to claim 1, further comprising: an auxiliary power supply capacitor, wherein a negative electrode of the auxiliary power supply capacitor is coupled to the chip power pin or the chip ground pin, and a positive electrode of the auxiliary power supply capacitor is coupled to the chip auxiliary power pin; and wherein the auxiliary power supply capacitor is adapted to store charges generated on the chip auxiliary power pin.

6. The voltage conversion circuit according to claim 5, wherein the auxiliary power supply capacitor is integrated in the switching power supply chip or configured as a peripheral of the switching power supply chip.

7. The voltage conversion circuit according to claim 1, wherein the switching power supply chip further comprises: a control unit, wherein a power input end of the control unit is coupled to the chip power pin, and a first output end of the control unit is coupled to an input end of the driving circuit, which is adapted to provide a first control signal for the driving circuit.

8. The voltage conversion circuit according to claim 7, wherein the first control signal is a switch control signal.

9. The voltage conversion circuit according to claim 7, wherein the driving circuit comprises N NMOS transistors and M PMOS transistors; and wherein all gates of the N NMOS transistors and the M PMOS transistors are coupled to the first output end of the control unit, and are adapted to input the first control signal; drains of the N NMOS transistors and the M PMOS transistors are coupled together to work as an output end of the driving circuit, which is coupled to a gate of the power MOS transistor; and all sources of the N NMOS transistors are coupled to the chip ground pin, and all sources of the M PMOS transistors are coupled together to work as the power input end of the driving circuit, which is adapted to receive the working voltage form the driving circuit power supply unit.

10. A non-isolated power supply system, comprising: a rectifier unit, an output inductor, a feedback diode, and a voltage conversion circuit according to claim 1;

wherein an input end of the rectifier unit is coupled to an external Alternating Current (AC) power supply, an output end of the rectifier unit is coupled to a high-voltage input pin of the switching power supply chip of the voltage conversion circuit, and the rectifier unit is adapted to rectify the external AC power supply into a Direct Current (DC) which is input to the high-voltage input pin;

wherein an input end of the output inductor is coupled to the chip ground pin of the switching power supply chip, and an output end of the output inductor is coupled to an output end of the non-isolated power supply system; and wherein a positive electrode of the feedback diode is coupled to the output end of the non-isolated power supply system, and a negative electrode of the feedback diode is coupled to the chip power pin, which is adapted to feed back an output voltage of the non-isolated power supply system to the chip power pin.

11. The non-isolated power supply system according to claim 10, wherein the control unit further comprises: a third output end, which is coupled to a control signal input end of the boost unit and is adapted to control the boost unit to switch on or off, wherein when the output voltage of the non-isolated power supply system is high and a voltage of the chip power pin reaches a working voltage of the driving circuit, the third output end of the control unit outputs a third control signal to control the boost unit to switch off, and the chip power pin provides the working voltage for the driving circuit through the buffer unit of the switching power supply chip; and when the output voltage of the non-isolated power supply system is low and the voltage of the chip power pin is less than the working voltage of the driving circuit, the third output end of the control unit outputs the third control signal to turn on the boost unit and an output end of the boost unit provides the working voltage for the driving circuit.

12. The non-isolated power supply system according to claim 10, further comprising:

an output capacitor which has a positive electrode coupled to the output end of the non-isolated power supply system and a negative electrode coupled to a ground pin of the non-isolated power supply system;

a chip power capacitor which has a positive electrode coupled to the chip power pin and a negative electrode coupled to the chip ground pin; and a freewheel diode which has a positive electrode coupled to the ground pin of the non-isolated power system and a negative electrode coupled to the input end of the output inductor.

13. A non-isolated power supply system, comprising: a rectifier unit, an output inductor, a feedback diode, and a voltage conversion circuit, the voltage conversion circuit comprising:

a switching power supply chip which comprises a power MOS transistor and a driving circuit, where the driving circuit is adapted to drive the power MOS transistor; and a driving circuit power supply unit which comprises a boost unit, wherein when an output voltage of the boost unit is less than a working voltage of the driving circuit, an internal power supply of the switching power supply chip provides the working voltage for the driving circuit; and when the output voltage of the boost unit reaches the working voltage of the driving circuit, the output voltage of the boost unit provides the working voltage for the driving circuit;

wherein the switching power supply chip further comprises: a chip power pin and a chip auxiliary power pin;

wherein the driving circuit power supply unit further comprises a buffer unit, where an input end of the buffer unit is coupled to the chip power pin, and an output end of the buffer unit is coupled to a power input end of the driving circuit and the chip auxiliary power pin; and when the output voltage of the boost unit is less than the working voltage of the driving circuit, the internal power supply of the switching power supply chip provides the working voltage for the driving circuit through the buffer unit; and wherein the buffer unit comprises a first MOS transistor, wherein an input end of the rectifier unit is coupled to an external Alternating Current (AC) power supply, an output end of the rectifier unit is coupled to a high-voltage input pin of the switching power supply chip of the voltage conversion circuit, and the rectifier unit is adapted to rectify the external AC power supply into a Direct Current (DC) which is input to the high-voltage input pin;

wherein an input end of the output inductor is coupled to the chip ground pin of the switching power supply chip, and an output end of the output inductor is coupled to an output end of the non-isolated power supply system;

wherein a positive electrode of the feedback diode is coupled to the output end of the non-isolated power supply system, and a negative electrode of the feedback diode is coupled to the chip power pin, which is adapted to feed back an output voltage of the non-isolated power supply system to the chip power pin; and wherein the control unit further comprises: a third output end, which is coupled to a control signal input end of the boost unit and is adapted to control the boost unit to switch on or off, wherein when the output voltage of the non-isolated power supply system is high and a voltage of the chip power pin reaches a working voltage of the driving circuit, the third output end of the control unit outputs a third control signal to control the boost unit to switch off, and the chip power pin provides the working voltage for the driving circuit through the buffer unit of the switching power supply chip; and when the output voltage of the non-isolated power supply system is low and the voltage of the chip power pin is less than the working voltage of the driving circuit, the third output end of the control unit outputs the third control signal to turn on the boost unit and an output end of the boost unit provides the working voltage for the driving circuit.

\* \* \* \* \*